US008645760B2

(12) United States Patent
van Gilluwe

(10) Patent No.: US 8,645,760 B2
(45) Date of Patent: Feb. 4, 2014

(54) ALTERNATE PROCEDURES ASSISTING COMPUTER USERS IN SOLVING PROBLEMS RELATED TO ERROR AND INFORMATIONAL MESSAGES

(75) Inventor: Frank van Gilluwe, Mountain View, CA (US)

(73) Assignee: FAQware, Menlo Park, CA (US)

( * ) Notice: Subject to any disclaimer, the term of this patent is extended or adjusted under 35 U.S.C. 154(b) by 89 days.

(21) Appl. No.: 12/461,023

(22) Filed: Jul. 29, 2009

(65) Prior Publication Data
US 2010/0115348 A1 May 6, 2010

Related U.S. Application Data

(60) Provisional application No. 61/084,590, filed on Jul. 29, 2008.

(51) Int. Cl.
*G06F 11/00* (2006.01)
(52) U.S. Cl.
USPC ................................ 714/38.1; 714/48; 714/57
(58) Field of Classification Search
USPC ........................................ 714/48, 57, 26, 38.1
See application file for complete search history.

(56) References Cited

U.S. PATENT DOCUMENTS

| 5,740,357 | A | * | 4/1998 | Gardiner et al. | 714/57 |
| 5,758,124 | A | * | 5/1998 | Ogata et al. | 703/27 |
| 5,892,898 | A | * | 4/1999 | Fujii et al. | 714/57 |
| 5,944,839 | A | * | 8/1999 | Isenberg | 714/26 |
| 6,012,152 | A | * | 1/2000 | Douik et al. | 714/26 |
| 6,029,258 | A | * | 2/2000 | Ahmad | 714/46 |
| 6,334,193 | B1 | * | 12/2001 | Buzsaki | 714/2 |
| 6,529,954 | B1 | * | 3/2003 | Cookmeyer et al. | 709/224 |
| 6,742,141 | B1 | * | 5/2004 | Miller | 714/26 |
| 7,007,200 | B2 | * | 2/2006 | Salem | 714/26 |
| 7,016,954 | B2 | * | 3/2006 | McKenzie et al. | 709/224 |
| 7,191,364 | B2 | * | 3/2007 | Hudson et al. | 714/38.11 |
| 7,293,201 | B2 | * | 11/2007 | Ansari | 714/38.14 |
| 7,360,125 | B2 | * | 4/2008 | Krebs | 714/48 |
| 7,475,286 | B2 | * | 1/2009 | Altaf et al. | 714/27 |
| 7,757,126 | B2 | * | 7/2010 | Vidiyala | 714/38.14 |
| 2003/0028825 | A1 | * | 2/2003 | Hines | 714/37 |
| 2004/0024840 | A1 | * | 2/2004 | Levine et al. | 709/217 |
| 2007/0127455 | A1 | * | 6/2007 | Fujioka | 370/356 |
| 2007/0277061 | A1 | * | 11/2007 | Ashe | 714/57 |

* cited by examiner

*Primary Examiner* — Yolanda L Wilson
(74) *Attorney, Agent, or Firm* — David B. Dort; Dort Patent, P.C.

(57) ABSTRACT

The invention monitors display (error) messages from software programs presented to users and looks for items of interest. When detected, the text of the message is collected along with source of the message, and other details. This data is checked against a database of Messages, either locally, or networked to a remote database. If the issue has not been previously detected it is added to the database. If the message had been detected previously, counters recording frequency of occurrence. Then an option to see additional information is provided. If selected the database returns all the information it has on this specific issue. Also, additionally created content that normally does not exist in the message such as which application and vendor issued the message, frequency of occurrence, and vendor contact information. Additional content such as a detailed description and solutions that were manually created is included in the results to the user. The user can perform additional research and the collected information can be emailed to another user or company.

4 Claims, 14 Drawing Sheets

412

Solutions and Fixes

*If you want to perform an action on a file or folder you don't have access to, you have to change the permissions. You can change permissions for one file, or enable access to all the files under a folder (and any sub-folders as well). Unfortunately, you have to go through a lot of hoops in an unnecessarily complex set of dialogs to do this. This is especially annoying if you need to edit a configuration file or delete a malware or virus file.*

Solution 1 of 3

*In this example, we want to delete the keylog file that resides in the system32 directory. As with most files in this directory, the permissions deny us access to the file so we can't delete it even with administrative privileges. To change permissions or a file or folder perform the following steps:*

*1. In Explorer, right-click on the folder name or file name and select Properties.*

414

Forum Help

Check out what others say about this issue and review or add your own comments and solutions!

Go to Forums on topic.

416

Vendor Summary

| | |
|---|---|
| Vendor | Microsoft Corporation (more info...) |
| Phone | 1-425-882-8080 |
| | 1-800-642-7676 |
| Web | Main |
| | USA |
| Assistance | Support |
| | Downloads |

418

Research this Issue

| "Destination Folder Access Denied" Windows Vista | Search |

Microsoft Sites Search | Blogs | All Web Search

Destination Folder Access Denied - MSDN Forums
MSDN Forums » Software Development for Windows Vista » General Windows Vista Development Issues » Destination Folder Access Denied ...
forums.microsoft.com

Destination Folder Access Denied in Windows Vista Networking and ...
Feb 4, 2008 ... Destination Folder Access Denied in Windows Vista Networking and Sharing ... I have Vista Home Premium, I am trying to add a Maxtor Shared ...
www.microsoft.com

What's the story on "Folder Access Denied"? - MSDN Forums
General Windows Vista Development Issues ... delete the .exe file and I get "Destination Folder Access Denied: You need permission to perform this action". ...
forums.microsoft.com

Icon titled "desktop" - why??? in Windows Vista General Discussion
Dec 11, 2007 ... Icon titled "desktop" - why??? in Windows Vista General Discussion ...
"Destination Folder Access Denied", "You need to confirm this ...
www.microsoft.com 1 2 3 4 More results »

Figure 4b

ALTERNATE PROCEDURES ASSISTING COMPUTER USERS IN SOLVING PROBLEMS RELATED TO ERROR AND INFORMATIONAL MESSAGES

REFERENCE TO PRIORITY DOCUMENTS

This Application claims priority under 35 USC 119(e) to Provisional Application Ser. No. 61/084,590, entitled Method and System for Assisting Computer Users in Understanding Messages and Solving Problems, filed in the USPTO on Jul. 29, 2008, which is incorporated by reference in its entirety for all purposes.

BACKGROUND OF THE INVENTION

U.S. Pat. No. 7,191,364 (2007) shows a method for creating dumps of data from a crash or hang and sending such data to a server for possible solutions. However, it clearly does not deal with important system crashes or hangs where the system is often non-functional or unstable, but covers situations where the operating system or running applications issue an informational, warning or problem type message.

U.S. Pat. No. 7,149,928 2006) shows a means to monitor an application program for a fault or crash and send such information to a server. However, has no means to provide any information to the user that originated the problem or assist the user in any way.

U.S. Pat. No. 7,028,056 (2006) shows a method to collect information locally following a critical software failure. While my invention does collect data, it is not related to software failures that prevent the system from continuing to operate, but covers situations where the operating system or running applications issue an informational, warning or problem type message and the operating system continues to run.

U.S. Pat. No. 6,874,125 (2005) shows a method to attach a feedback button to every dialog, message, and top-level windows dialogs.

Microsoft (software/OS) provides an example of a hand coded error dialog from Windows (shown in FIG. X). This shows a way to check for a solution for one error, but it requires a programmer to create the special dialog for each specific error, and it does not ensure there is any solution or additional information.

Avanquest PowerDesk Professional User Manual, v7, 2008—Page 161-165 (first published in 1998). Dialog Helper has a means to attach a function button to Save and Save-as dialogs, but no others.

SUMMARY OF THE INVENTION

The present invention provides a need, unrepresented in the prior art discussed above, by assisting the user in an effective and efficient search for a potential solution to a software message (usually an error message). A summary of benefits to the user of this invention includes:

Helps user to understand what a message means, which program generated the message, the publisher of the program and other helpful details.
See the frequency of occurrence as compared with other users.
Access specific help on a message with a single-click or button selection.
Makes it easy to research the message using the dialog text without having to hand type in the text of the message.
Provides a means to include a detailed description and solutions to the user.
Provides information about the publisher and how to get support from the publisher.
Requires no modifications to the publisher's Programs.
Ability to send the message contents and additional details to another person who can assist with the issue.

The present invention always provides solution information, in contrast to the '364 which cannot provide any information unless someone has manually created such information after the collection of data. The present invention differs from the '928 patent and improves upon it, in that it helps a user by providing information about the issue and covers informational, warning and problem type messages from all sources, including the operating system and application programs. The present invention improves on the Microsoft system as it requires no coding by the application program or operating system to create a message that has a solution option. In addition, the invention always provides solution information. The invention, improves over '125 patent in that it selectively attaches a solutions button to specific types of dialogs, for an entirely different purpose than the '125 patent.

Many messages produced by an operating system and other software applications are confusing to the user, cryptic or misleading typically offering the option "OK" without help to solve the issues at hand. For example, the Windows® operating system(s) does not allow users to capture the message to help search out an answer. To use a search engine such as Google, users have to retype the message in and wade through many useless forums, ads, and products hoping to find some clue as to what it means and how can the issue be fixed.

The present invention provides the first means to get the answers users need with a minimum of effort. When an error or warning message appears, a specialized icon appears in the title bar.

In the operation of a main embodiment of the invention, the client program module of the primary embodiment of the invention intercepts all Windows dialogs and looks for items to identify warnings and errors of interest. This includes the message type, icons used, and text within the message. There will also be an exclusion list to skip messages that are not of interest, but would be incorrectly triggered. The error contents and source will also generate a unique token to identify this message.

The client program module also has a settings page that offers some minor options and control for a user. One of the options which may be enabled by default (with proper user disclosure) is to send all error information to the networked data accumulation server (NDAS) in an anonymous fashion, even if the user doesn't click on the activation icon in an error message. This is a preferred embodiment of the invention which can quickly create and build the database of error content located in the networked data accumulation server. It also allows the data accumulation process, included in many embodiments of the invention (whether manual or automatic) to identify the most frequent issues and put more attention on these particular problems and to allocate network and data resources appropriately.

The SQL server component of particular embodiments of the invention collects the error information and is used to create database generated web content. Since the database will become large(r) over time, it needs to be scalable and fast, but these are mostly phase 2 concerns. The server also hosts a Vendor database with generic information about the Vendor, Vendors website, Support from that vendor, logo, and other details.

A management facility will allow the content manager components to add additional information and help optimize the results. They can also include screen shots and blur out areas that change for each user. They can also "connect" up like errors or reference other errors as appropriate. Content managers will also link to a vendor's FAQ section that talks about the specific issue.

The web site component of the invention displays the content from the database. The site will also contain a number of category index pages with links to each content page. This is necessary for the search engine robots to locate and index all the content pages. The generated content can include a screen-shot of the specific error or a fake message that includes the title, content, buttons and icon of the error message. It will be automatically created in a number of styles to match the most common skins and Os(es) supported. For example, if the user has XP, with chrome style, the generated error message will use the same style.

Lastly, the web site component includes a targeted forum section at the bottom of each content page. Users can also access the forum from the home page, but normal access is through the content page. Users can read posts from other users, reply to those posts, or create new posts. We may also moderate some of these forums or allow companies who own the related product to be a moderator for issues with that product.

The forum system provides the ability to automatically email users (at their choice) when a selected forum changes. The invention also offers the ability to send private messages between forum users.

BRIEF DESCRIPTION OF THE DRAWINGS

Referring now to the figures included in the application:

FIG. 4b illustrates a second sample display screen encountered by a user when the solution button is selected;

FIG. 8B-1 is na example of a menu displayed when a user activates the solution button;

FIG. 8B-2 is another example of the menu displayed when a user activates the solution button.

DETAILED DESCRIPTION OF THE OPERATION

While the examples given below generally are shown for Windows® operating systems the invention may to any OS. In general, a specific series of embodiments of invention are given as examples, and discussed under the trade name Fault-Wire®, although Faultwire® includes many of the embodiments of the invention, the invention is not limited to those embodiments as they are for illustrative purposes only.

Figure 1:
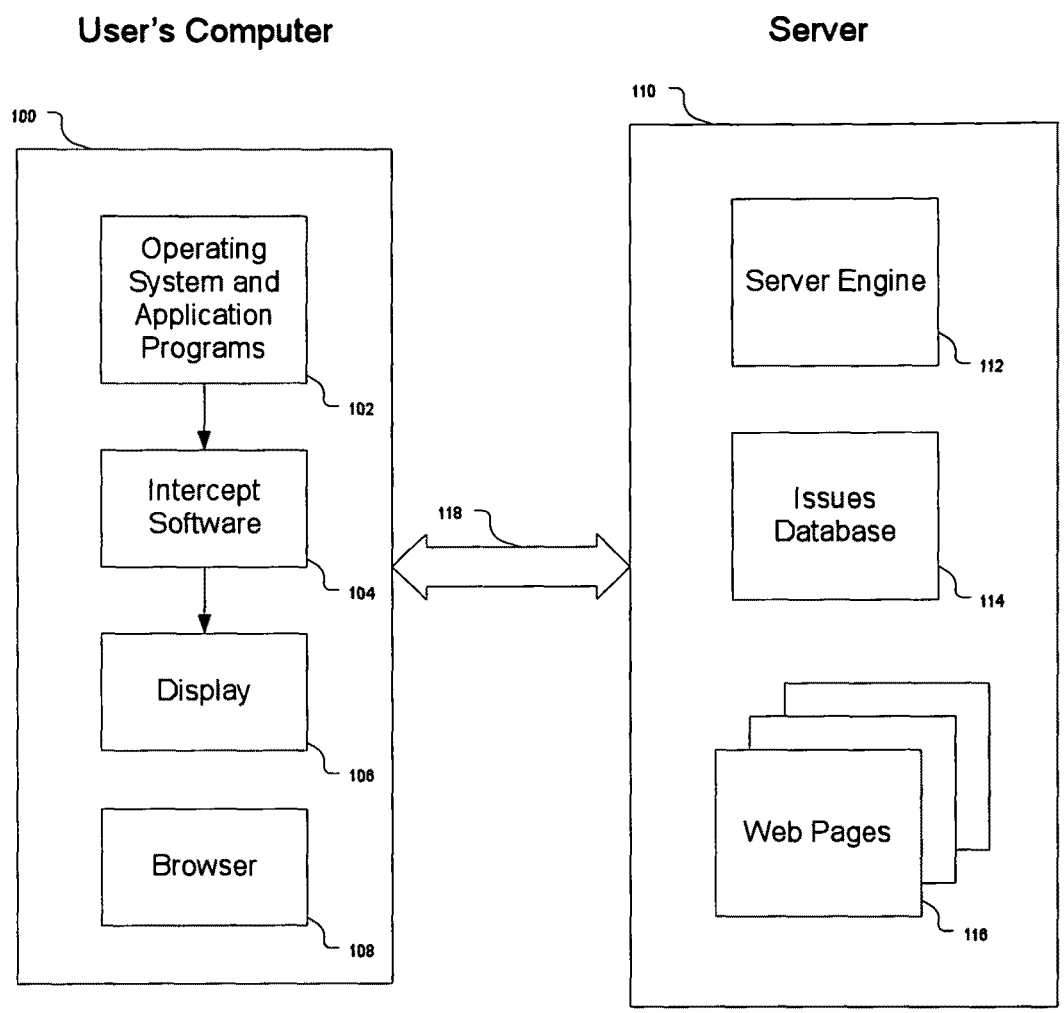
FIG. 1 is a Block diagram of the components of the User's computer and separate server.

Now referring to FIG. 1, a user's computer 100 contains an operating system and application programs 102, along with the invention's intercept software 104, a display 106 and a communications path 118 between the user's computer and the server 110. The server 110 has a server engine 112 that saves Message information from the intercept software 104 over the communications path 118. The database 114 is used to store new Message information if the information has not been previously recorded as well as recording frequency of occurrence of each Message. Should the software 104 request a solution page for the Message, the Server Engine 112 will build a web page 116 containing the information from the database for this specific issue and the web page 116 is passed via the communications link to the computer's browser 108. This method has the advantage of helping multiple users. In addition, having multiple users contribute to the database will expand the collection of information that is available to all the users.

Figure 2:
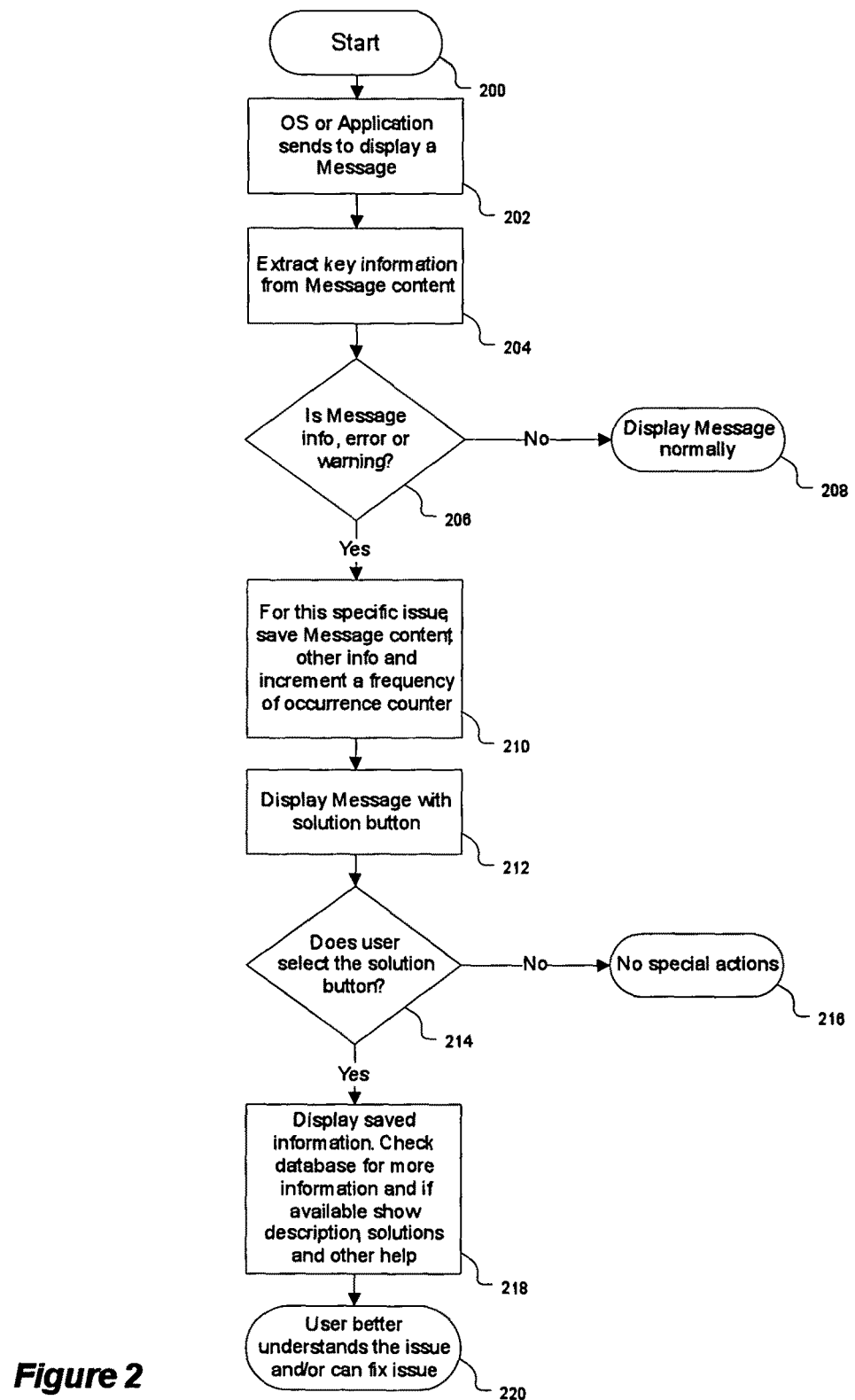
FIG. 2—A flowchart of the overall operation of a first embodiment of the invention.

FIG. 2 shows the process staring at step 200. An operating system or application program 202 sends to the display a Message. Before the Message appears, the invention intercepts the process 203 and extracts key information from the Message and the Message sender in 204. This can include all the text within the message, special graphics such as a warning or problem icon, and the identification of which application or operating system component sent the message.

A determination is made if this Message is a warning, problem or informational type Message at 206, which is explained in more detail later. If the Message is not one of interest, then at 208, the Message displays normally and no further actions are taken. If the Message is of interest, at 210, the information is saved in database 114 on the server 110 if this data has not been saved before. In all cases, a frequency of occurrence counter for this specific Message is incremented in database 114 on the server 110. In 212, the Message is displayed and a solution button is made available.

When any system or application dialog opens, the invention executes an investigation module that checks to see if it appears to be an error or warning message of interest. For those dialogs of interest, the invention, through the execution of an insertion module, inserts a solution icon in the title bar as shown in FIG. A1. This icon is used to get additional information about the error, either locally, or by accessing the FaultWire website (a sample map of the site is shown in FIG. B1, as would be used in a particular embodiment of the invention), with a page specific to the issue at hand. In general, the specialized solution button appears to the left of any other buttons that appear in the title bar. The user can click on the icon to go to our specific web page with details about the error and possible solutions.

Embodiments of the invention use automatic means to find out if the icon should appear or not. An executable module then scans the dialog manager list to see if it should override the automatic state and either include or exclude the item. This process is discussed in more detail below.

When FW loads it issues a command to hook messages. For example, Windows provides an API call SetWindowsHookEx, that along with the first parameter "WH_GETMESSAGE" tells Windows to installs our hook procedure that monitors messages posted to a message queue. The specific line of code (in this particular example) is: [g_hhookSend=SetWindowsHookEx(WH_GETMESSAGE, GetPostMsgProc, g_hinstDll, dwThreadId);] The GetPostMsgProc is the "hook" that gets called when a message appears on the display along with details about the message. As a sample more detail on the Window API function is included as Appendix A. It should be noted that the specific line of code is used for illustrative purposes only and will vary in different embodiments.

Figure 3:
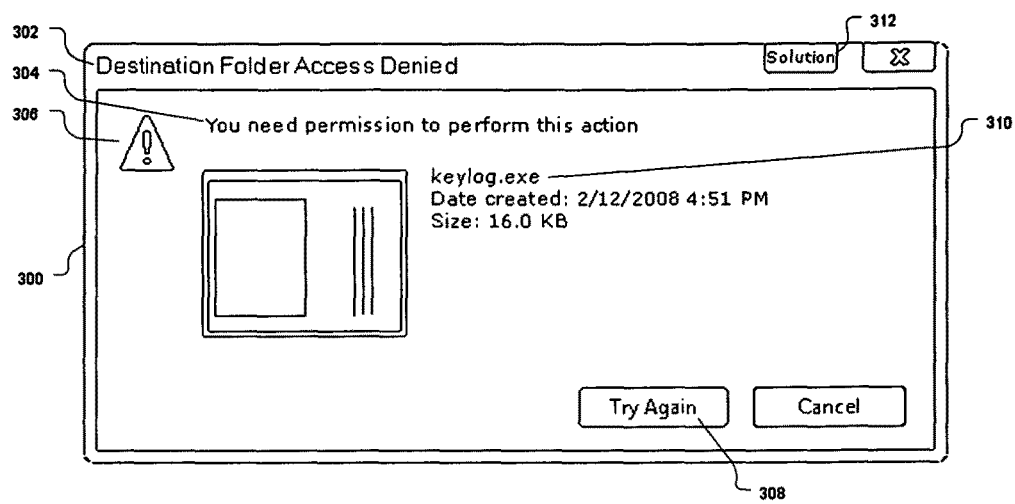
FIG. 3—An example warning dialog showing the components and solution button.

One way the Message may appear is shown in the example in FIG. 3-300. A Message such as this may contain a number of elements, but these elements may or may not appear depending on the Message. Typical elements include a title 302, the body 304, an icon 306, and additional text or graphics 310. Messages of interest normally have one or more buttons 308. This Message example shows one way the solution button 312 could be added to the Message by the invention, although the solution button could be elsewhere within or outside the Message, or a hot-key (a combination of one or more keyboard keys) could be used.

Continuing the process in FIG. 2, at 214, the user may not select the solution button, in which case, 216, no special action occurs. If the user should select the solution button, the information collected in 204 is now displayed to the user in 218. Any additional previously saved information about this issue is also displayed such as a detailed description and solutions. This information helps the user understand and/or solve the issue.

Figure 4A:
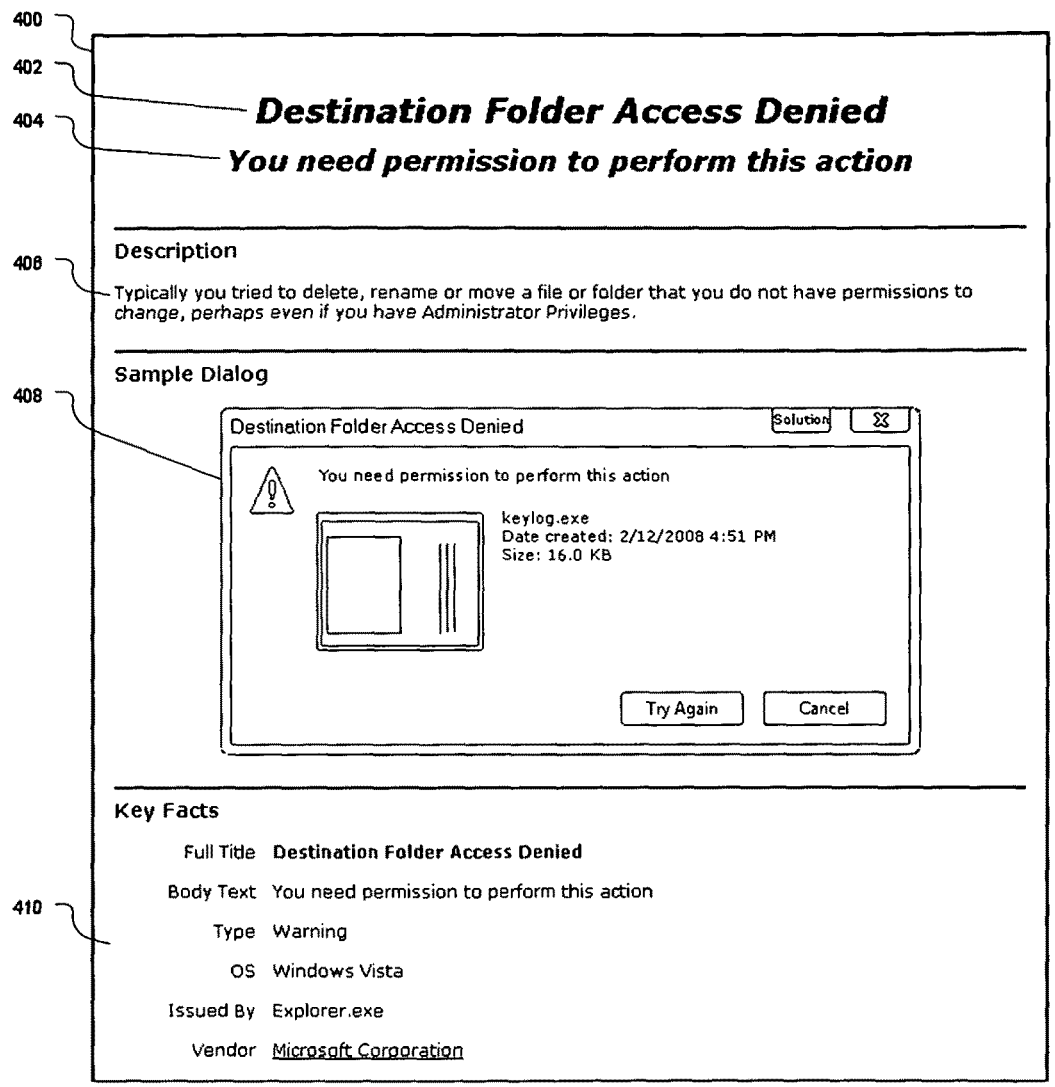
FIG. 4a—illustrates a first sample display screen encountered by a user when the solution button is selected.

One way this information is conveyed to the user is shown in FIG. 4a-400. The Message title appears at 402, and is followed by the Message body text in 404. In 406 an optional description of the issue appears. A screen shot of the Message appears in 408 that is a similar or exact image of the specific issue Message. Key facts appear in 410.

FIGS. 4a and 4b is a preliminary view of the web page content the user sees when they click on the FaultWire (solution tab/button) icon in the error "Destination Folder Access Denied". Not shown is the navigation, header, footer and advertising information.

The web page is specific to the error message and explains the issue and provides a solution. In some cases, it may be that FaultWire does not have detailed information. In these cases, information is provided as to which application generated the message and the search section can help users quickly locate more information with a minimum of additional work.

The search box already includes key words from the error message and is targeted for the OS (or vendor, if not an OS related issue). Multiple tabs are also included to tightly focus the search. The first tab is specific to the error message's vendor. The second tab searches the web, but excludes known sites that are a waste of time or that require any kind of logon.

Continuing to FIG. 4b-412, an optional solution for the issue appears. In 412 a link is provided to a forum where users add comments and view what others have said about this specific issue. At 416 a summary of vendor information appears. Lastly, at 418 the error Message text is submitted to a search engine to view additional links about this issue that appear on the Internet. The user can easily copy the text from different areas of 400 to communicate the issue with other people without having to type the text again.

Figure 5:
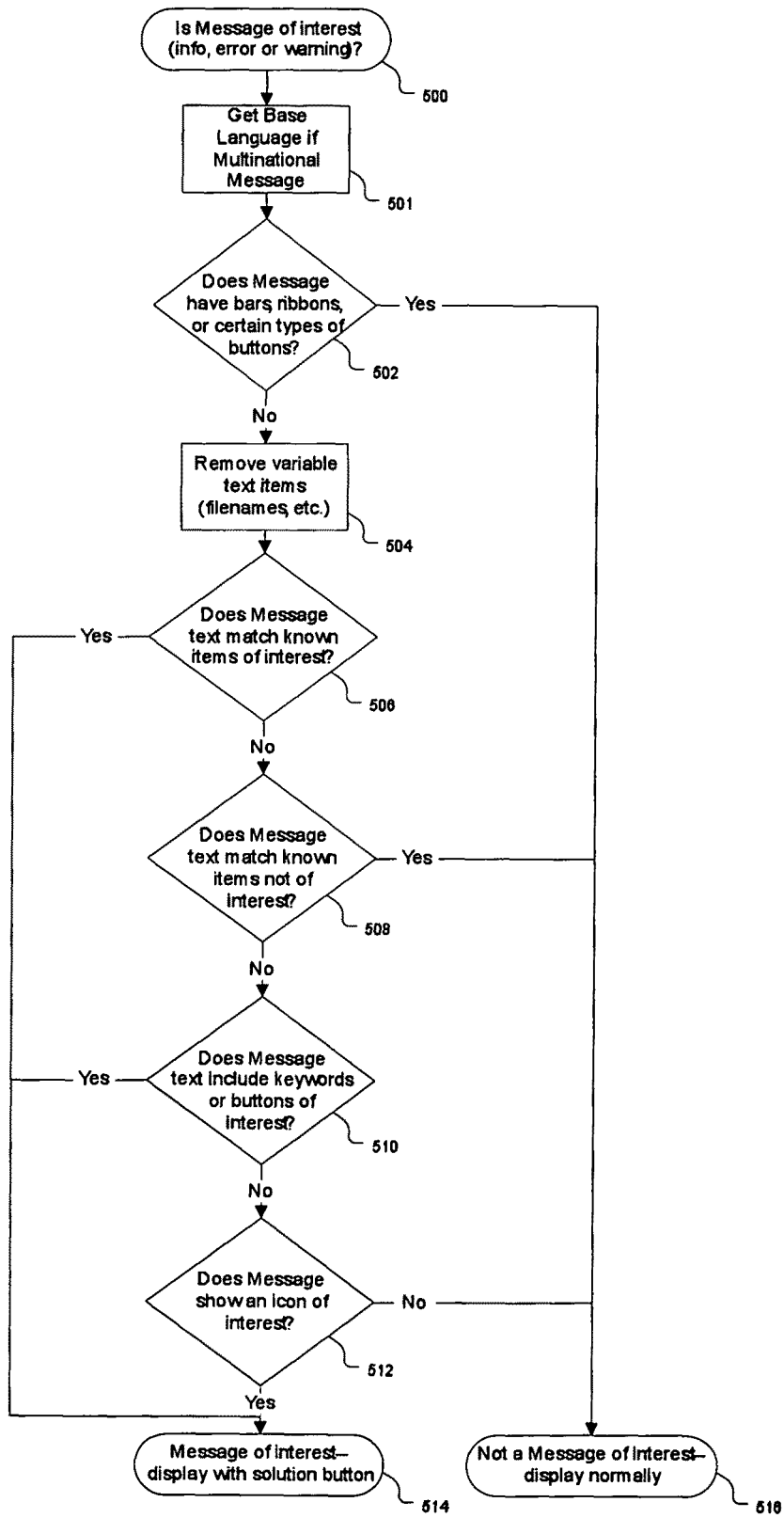
FIG. 5 illustrates a flowchart of the process to determine if a dialog is one of interest, such as a warning, problem or informational dialog.

FIG. 5 illustrates a 500 explains the process of determining if the Message is of interest or not by expanding the decision shown in FIG. 2-206. First, some operating systems and programs offer a base language (for example English) for a multi-national message support. In 501, if such a base message text is available, it is used in place of the actual message text to simplify later tests. An alternative approach would eliminate this step and handle each message in it's original language and use text comparisons that match the language used. For the balance of this section, we'll assume the message is in English.

In 502, if the Message contains a menu-bar, ribbons, scroll bars, a status bar or specific button text such as "Finish", "Finished", "Done", "Next" or "Back", it is not a Message of interest and the Message is displayed normally at 516. Otherwise at 504 we examine the text that appears in the Message such as 302, 304 and 310, and remove any pathnames, filenames, dates, times, sizes, and other information that will change with each occurrence of the specific Message. The resultant text is examined in 506 to see if the Message text or a portion of the text matches a list of known issues. If so, this is a Message of interest 514.

If in 506, no match is made, a check 508 is made to see if the resultant text or a portion of the text from 504 matches a list of known non-issues. If a match is made, then this is not a Message of interest 516.

If in 508 no match is made 510 checks to see if the resultant text from 504 has a keyword that indicates it is a Message of interest. If using English, keywords may include words like "Error", "Errors", "Warning", "Fatal", "Failed", "Problem", "Problems", "Denied", "unexpected", "confirm", "incompatible", "unable", "cannot", "can't" or "could not". Text in all buttons is also examined for keywords such as "Try Again", "Abort", "Retry", "Ignore", "Check online" or "Hide details". If these keywords appear, then the Message is considered a Message of interest 514.

If no keywords of interest are found in 510, then 512 checks to see if the Message uses a common icon that signifies a Message of interest. Some of the icons could include those signifying a warning, problem, forbidden, information, or help. If such an icon is not detected, then it is not a Message of interest 516. Otherwise it is a Message of interest 514.

TABLE A

Issue Table of Interest

| Type | Title | Body | Filename | Comment |
| --- | --- | --- | --- | --- |
| Include | Red Alert | The data will not be read due to* | Excel* | This is always a problem we want to trap. |

If in 506, no match is made, a check 508 is made to see if the resultant text or a portion of the text from 504 matches a list of known non-issues. If a match is made, then this is not a Message of interest 516.

Non-issues are identified as Exclude type and otherwise similar to the prior include entries. It contains match strings for the title, body and application name. These strings can have a wildcard character "*" to signify anything after the asterisk is unimportant. These string comparisons should also be made case-insensitive. The comment field can be ignored and is just to explain what the issue is.

TABLE B

Sample Issues not of Interest

| Type | Title | Body | Filename | Comment |
| --- | --- | --- | --- | --- |
| Exclude | Disabled if read* | The option is disabled when* | Explorer.exe | This is not a warning. |

Expanding on the issue table, these will appear in the Dialog Manager screen. The issues table is created from two lists—the FaultWire provided list, and a user list. The FaultWire list may be updated from time to time, without affecting the user list. When read in, the FaultWire list is read first, and the user list read second. If changes are made to these lists (via the Dialog Manager) or an update to the FaultWire list, it is desirable to have them take effect immediately, but it is acceptable to require an unload/reload or reboot before it's accepted if too complex or other issues arise.

As an option, it is likely the invention should include a special case that does not attach the solution icon to any FaultWire dialog except for the test dialog. The concern is the possibility of some endless loop or hang should FaultWire issue a message and then FaultWire attempts to handle it.

Figure 6:
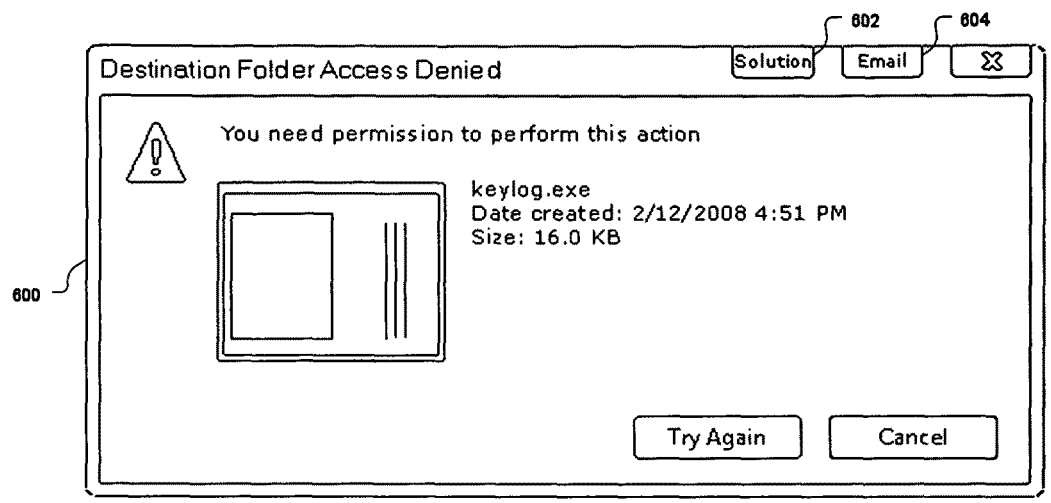
FIG. 6—An example Message with an Email button.

When a Message appears, a user may wish to communicate the issue to another person. Without this invention, it is cumbersome to have to type in the message text and gather additional information about the issue and details about the computer where the Message occurred. FIG. 6 shows a Message 600 where the invention provides a means to send the Message and additional information to another person, typically via Email by selecting the button 604. This button could be within the Message box, outside the box, as a drop-down from the Solutions button 602, or other placement or hot-key. Other alternative communication types include sending a text message to a cell phone; converting text to voice for an audio link or phone call; or sending the text through an instant messaging system, or creation of a video to a remote user.

Figure 7:
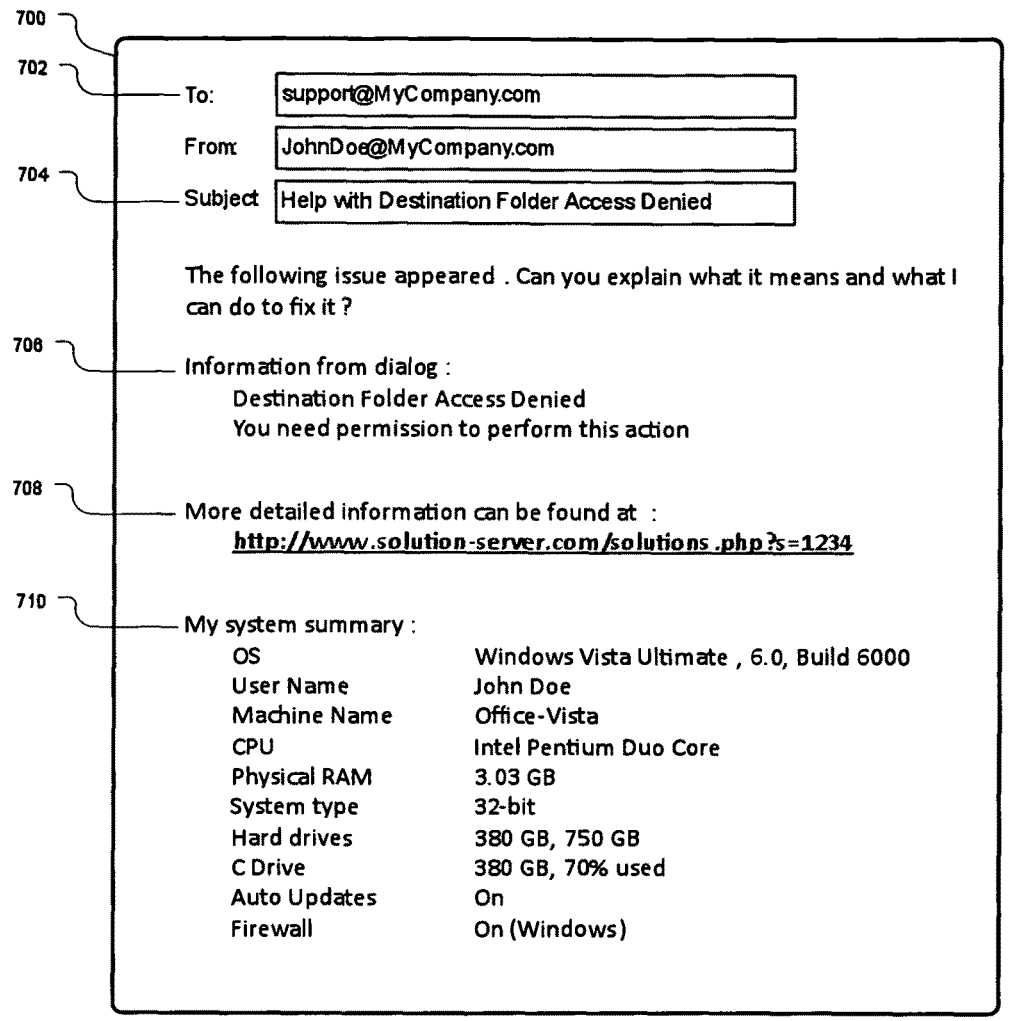
FIG. 7—An example automatically generated Email.
Figure 8A:
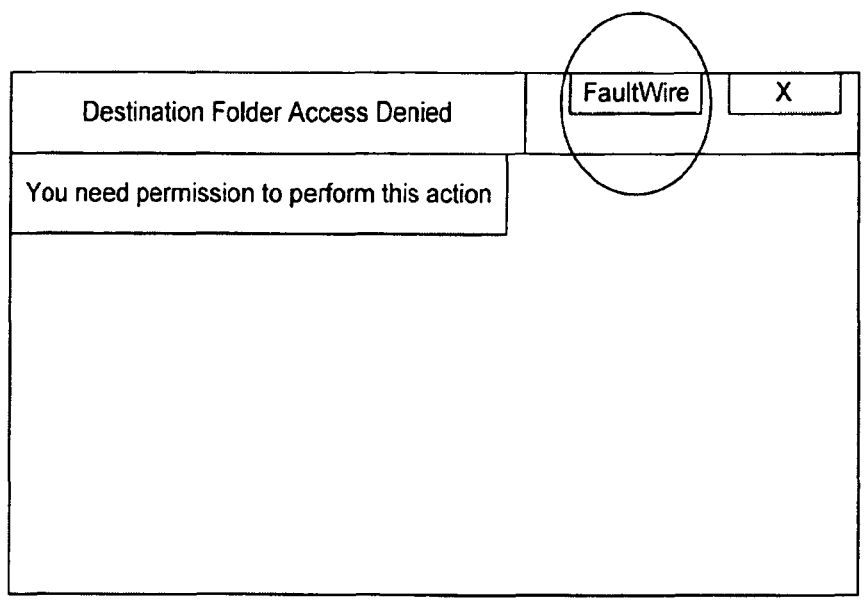
FIG. 8A is the sample of the display notice including the solution button.
Figures 1, 8B:
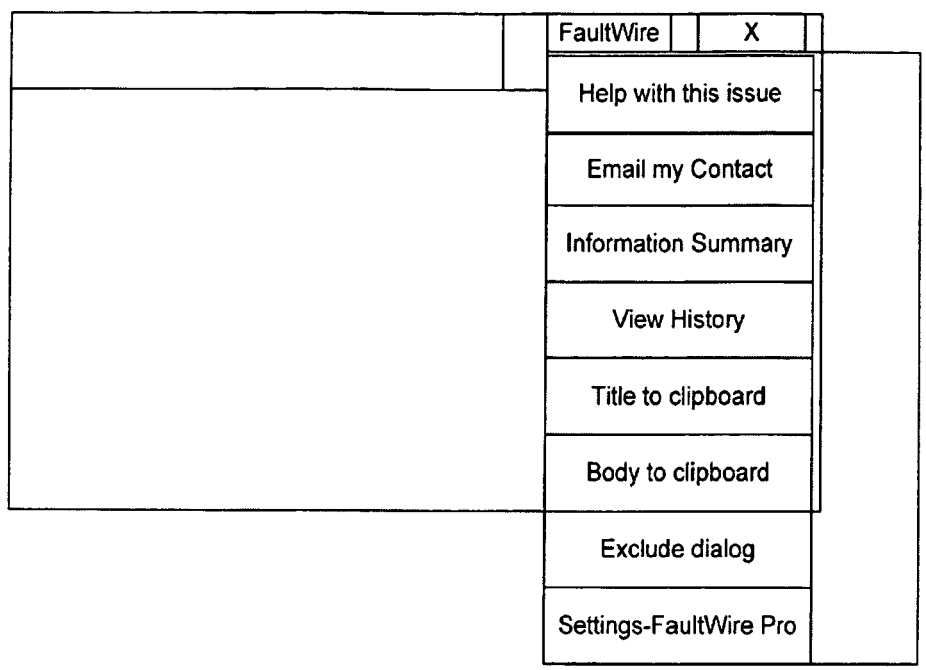
Figures 2, 8B:
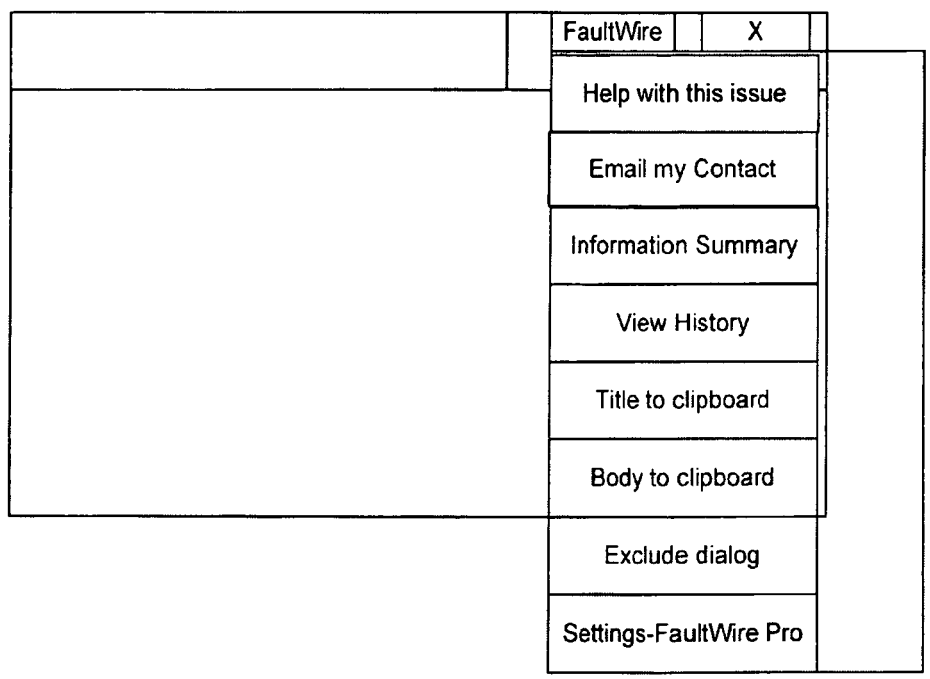
Figure 8C:
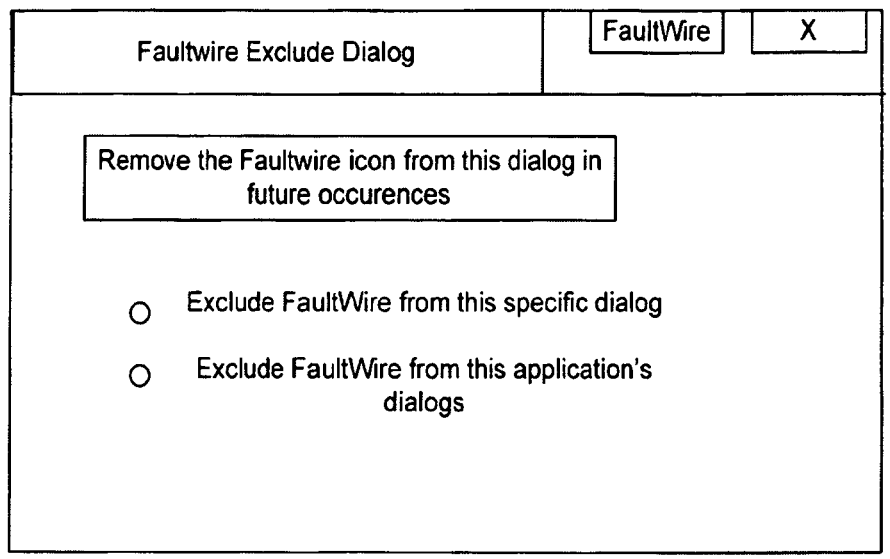
FIG. 8C is an example of a exclusion dialog screen.
Figure 8D:
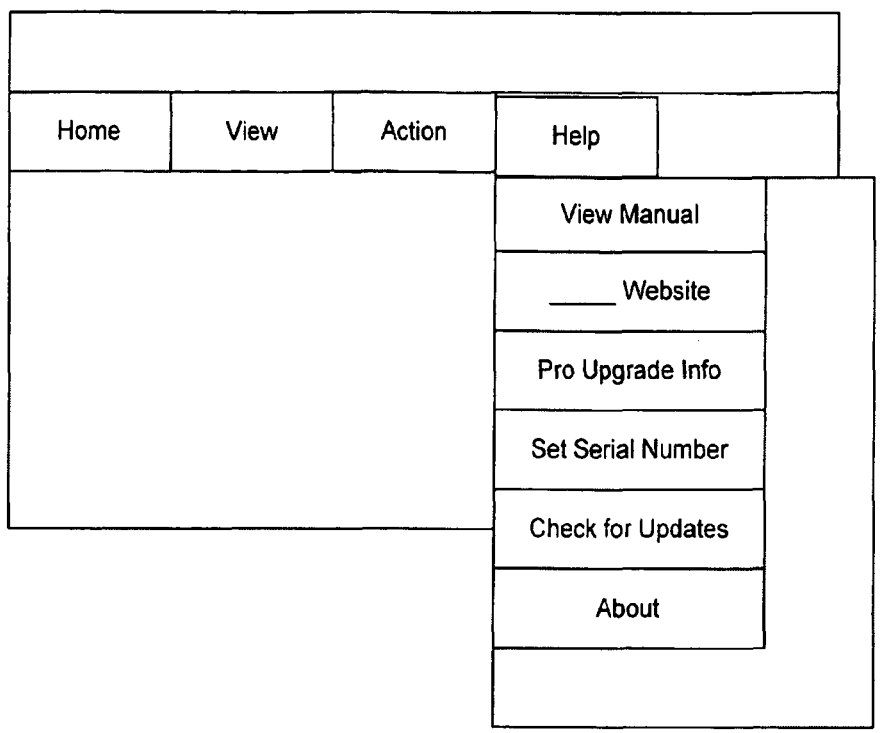
FIG. 8D is an additional menu.
Figure 9:
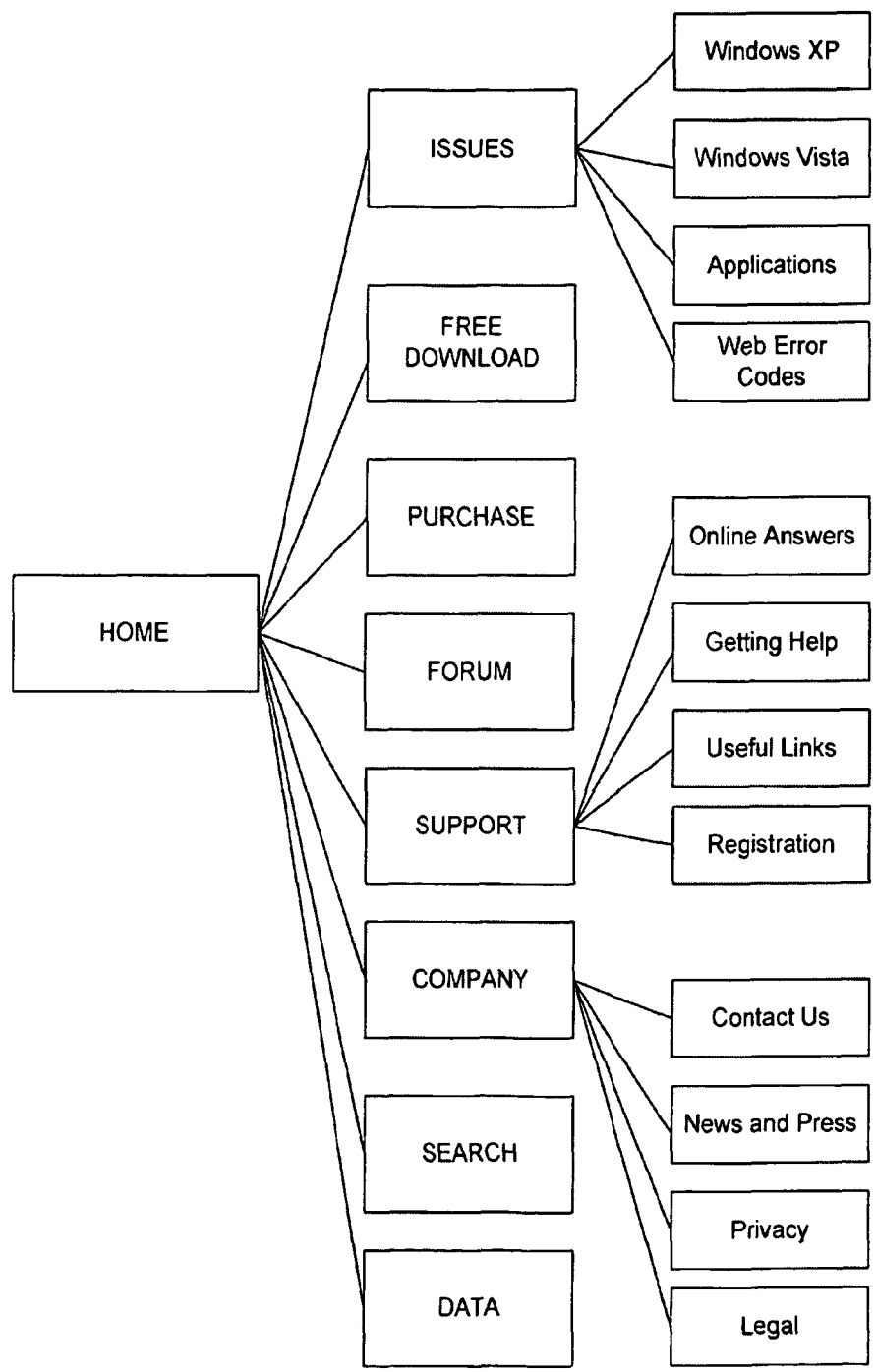
FIG. 9 is a site map as used in a primary embodiment of the invention.

When the communication function is selected via 602, the information collected is communicated to another party. The invention creates the message similar to FIG. 7-700. The created message includes a default to address 702. The invention can remember a default email address, such as a company's technical support email address or a technical friend that assists the user. The created message also includes a subject field 704 about the issue; summary information about the issue 706, a link where to get additional information 708; and details about the user's system 710. The user can add further details if necessary before the message is sent.

Alternative Embodiments

An alternative method places the server components such as the issues database 114 and web pages 116 within the user's computer 100 so no outside communication is necessary. This has the advantage of not requiring a server or active communications link. A second alternative method uses both a local and remote server databases, where the local database is used when no outside communication is available, and once such outside communication is available the two databases are synchronized.

The invention is contemplated in various implementations and does not have to have a server-back end. The system could be built as a totally local application, along with a table of solutions and other content that would be provided to the user. This might have to be updated periodically, whereas the server solution has any updated solutions and content immediately available. The server design embodiment helps collect the content for problem evaluation and trend analysis, and makes it easier to create solutions to common problems.

Other Operations

The FaultWire client also retains a set of default list of exclusions and inclusions that function as if they are part of the Dialog manager (included in table below), but they do not normally appear in the dialog manager screen. Pressing an activation combination (Alt+F9 in this instance) acts as an "undocumented" toggle to switch the view to the default list. When switched to the default list, the text string appears just below the list box "Defaults shown—use Alt-F9 to revert to user list". When the default list is shown, you can add, remove and edit just like the user list.

The format of the internal data structure is not critical, but examples are discussed below, and with a strong preference to the use two XML files—One XML file contains the user's entries and resides in the user's directory. A second file has the FaultWire's defaults and resides where FaultWire was installed. This allows us to update the defaults without affecting the user's overrides. The user's entries always override any FaultWire defaults. XML also makes it slightly easier to maintain our default file without having to create an additional data management program.

Other features in alternate embodiments include:

The invention can include an Auto Check for updates which checks daily for updates when started (at boot-time) or when application is started.

A feature that sends error information when error occurs—When any error occurs that we detect and that has not been excluded, we send all the error information to our server before any action has occurred. This way we get frequency of occurrence information and gather information even if the user doesn't go to the FaultWire site. With this option disabled, the error information is only sent when the user clicks on the FaultWire icon. Typically a Modem user might disable this feature due to possible affects to system performance.

Maximum space for history log—Sets the maximum size of the history log. The history log is handled as a FIFO such that the oldest entries are removed when space is needed for new entries. The minimum space is 1 MB. The history log is also used when the internet connection is down. Entries are flagged as not-sent. When the internet connection is re-established, all pending entries are sent to the FaultWire server and the sent flag in the log is cleared.

Browser to use for Microsoft and Windows issues—This has two drop-down choices, IE or Default. Since Microsoft issues may eventually direct into a Microsoft site, and Microsoft sites often fail to work properly in any browser other than IE, this overrides the default browser in this one instance. It has no effect if the default browser is IE.

Optional email contact in particular embodiments (subscription versions)—When an email entry is provided, the drop-down control will be enabled to send an email message with critical information to the recipient. It can be used by corporate help desks and users who support other family members. This entry supports multiple email addresses when separated by a semi-colon, which are all passed in the same email message. No validation is made this entry. The field will default to blank. If trivial, we should also support entry of a URL in this field. If the entry starts out as "http://" then a browser is opened at the specified address. The URL option is intended for corporate help desks that use an http address rather than email.

Error Identification and Weighting

One method to identify errors is to have a list of items the system in the invention looks at and assign "weights" to each one. For example, if the word "Error" or "Warning" appears in the title or body text it has a high weight. If a system warning icon or error icon is shown, it also has a high weight. Other factors include if only a single "Ok" button appears, it may have a medium weight. A Bayesian filter could be used to implement this technique, although we'd have to deliver a list of keywords and weights. Alpha 1 may start with a fixed set of simple items to compare as we refine the approach to use.

When a dialog is identified as a warning or error type, the FaultWire icon is added to the dialog. At the same time, key information is sent to the history log. If the internet is available we query if the error has been previously recorded for this OS. The server responds either that it has the information, and no further details are required, or that it needs a complete set of data. In the event all data is needed, the FaultWire client then sends the complete data set to the server where it is recorded. In either case, the server also counts the request so we collect frequency of occurrence information. If the Internet is not available, it is flagged as unsent in the history log, so that at a later time when the internet is active, all flagged history log items are sent in a similar way.

If the client setting "Send anonymous error information when error occurs" is off, then the information is only sent when they click on the "FaultWire" icon. Previously logged data is not sent in this state.

When the FaultWire icon appears, the user can take several actions within the dialog. They can ignore it and select any options presented by the dialog. They can click on the FaultWire icon. This opens a "dummy" progress dialog that indicates "Processing error information and linking to the FaultWire server". This will have a 45 second graphic progress indicator (without showing the actual time). It will also open the browser to the FaultWire web page specific for the error. Once the browser opens, our progress indicator can be canceled. It's just a dialog to placate the user when the browser application access is slow.

There is usually, if not always, a target page, since we have sent the error information used to create the web page in advance of displaying the page or will have sent the data before making the browser request. Note that double-clicking does not create two instances of the browser. Also the information is never sent twice to our server during the on-screen life of the dialog.

When the user hovers over the solution icon the tooltip appears with the message "FaultWire helps you understand and solve issues with this message".

The last option is to right click on the FaultWire icon. A drop-down menu appears with a set of functions. This is shown in FIG. A2 (with alternative version of the program).

When the user clicks on an active function, the follow actions occur:

>>Selection A2(1) is Help with this issue—This is the same as clicking on the FaultWire icon and will bring up the browser with the information about this error.

>>Selection A2(2) Email my contact—This sends an email along with information. See section 3.4.4 for details.

>>Selection A2(3) Information summary—displays a pop-up dialog with selected error information. It will be identical to the Information summary screen available from History in section 3.3.3.

>>Selection A2(4) View history—Open the history log viewer showing all errors and warnings recorded. The log shows the title, application name and the date/time the issue occurred. See section 3.3.3 for complete details.

>>Selection A2(5) Title to clipboard—Copies the dialog title to the clipboard.

>>Selection A2(6) Body to clipboard—Copies all the body text to the clipboard.

>>Selection A2(7) Exclude dialog—Brings up a second dialog to exclude the dialog or application, which is shown in FIG. A3 below.

>>Selection A2(8) Settings—FaultWire Pro—Displays the FaultWire settings dialog. The name in the drop-down changes in the free version to just "Settings—FaultWire".

In general, the following information is saved into the log and transmitted to the data collection server (See FIG. 1) when the server requests full information. When a field is not available it is set to null. While not all of the information will be displayed to a user, it is collected to make better choices of combining like data and issues with specific system variants.

TABLE 1.1

Information within error dialog

Title of dialog
Text of dialog (we may impose a limit of 1024 characters)
Absolute position of the start of body text **
Text on each button, and which button is the default (if any), and xy position
Button style (system default, etc.)
Title bar icon (extracted as a 16 × 16 gif/png/jpg)*
Main body icon/graphic (extracted as a gif/png/jpg) - Use format of original graphic item, or what is easy to extract, with PNG preferred.
Icon identification if using standard system icon (Warning, Forbidden, etc.); otherwise indicate "Unknown"
Absolute position of main icon/graphic - These items will vary on different systems and OSes, but is useful to construct a fake dialog on the web site. We don't need have a perfect representation.
Secondary icon/graphic (if present, extracted as a gif/png/jpg) - Use format of original graphic item, or what is easy to extract, with PNG preferred.
Absolute position of secondary icon/graphic - These items will vary on different systems and OSes, but is useful to construct a fake dialog on the web site. We don't need have a perfect representation.
Width and Height of error dialog - These items will vary on different systems and OSes, but is useful to construct a fake dialog on the web site. We don't need have a perfect representation.
List of standard title bar icons shown, if any (cancel, help, minimize, etc.)
Screen shot of dialog (jpg, medium quality)

TABLE 1.2

Back traced Information

The application filename
The path of the application
The application timestamp
The application's manufacturer's name
The application's text description
The application's version
The fault module name
The fault module path
The fault module timestamp
The fault module manufacturer's name
The fault module's text description
The fault module's version
Exception Code*
Exception Offset*
Hang Type*
Hang Signature*
Notes - captured Problem Signature details from Windows Crash event*
Locale ID

*Selective fields only occur with crashes and hang events.

TABLE 1.3

System Information (collected on startup, does not need to be dynamic)

Current Operating system (i.e. Windows XP SP2)
Operation System binary version string (includes build number)
Current Skin style (i.e. XP Silver, Olive or Default). Custom skins use "default".*
Amount of physical memory*
CPU id*
Desktop width and height in pixels*
System language*

TABLE 1.4

Version Information

Type - Free or Pro
Version number
User's serial number if paid version (for subscription validation)

When collecting information, the preferred embodiment is careful that their own operations do not issue additional errors and must be far more tolerant of problems such as low memory, disk problems and other items that most applications ignore. There may be cases where information is not collectible, save or transmit the information to the data collection server. In general, the invention needs to be tolerant of all these situations without creating new errors.

It is also likely that dialogs will be encountered that shouldn't be attempted to deal with. As these are discovered, they can be added them to the exclusion list. The exclusion list should also include a "log only" option that will not even attempt to send it to the internet (for example, problems related to the internet connection).

The invention also includes an email feature to alert other users to a specific problem or assist a corporate help desk. In settings, the "Optional email contact" is filled in with one or more target email addresses. When the user right-clicks on the solution icon in the dialog, and then clicks on the drop-down option "Email my contact", the user's email client is opened and the message is pre-loaded with the following dialog information and system summary details. If the "optional email contact" field is blank, we should still allow generation of the email with a blank "to" field (assuming this is technically allowed).

Email Sample:

```
To:     Email contact from internal settings entry
From:   This user (assumed filled in by the email client program)
Subject: Help - Error dialog title text goes here, up to 80 characters max
The following issue appeared. Can you explain what it means and what I
can do to fix it?
Information from dialog:
        Title   Title goes here
        Text    Body text goes here
More detailed FaultWire information at:
http://www.FaultWire.com/AB123456.com
My system summary:
        OS              Windows Vista Ultimate, 6.0, Build 6000
        User Name       Frank
        Machine Name            Office-Vista
        CPU             Intel Pentium Duo Core
        Physical RAM 3327 MB
        System type     32-bit
        Hard drives     380 GB, 128 GB
        C Drive                 120 GB, 70% used
        Auto Updates On
        Firewall                On (Windows)
This email was generated by FaultWire - the integrated problem solver!
Users closing as inserted by email client
```

It will be necessary to hook various error dialogs. This means most dialogs need to be monitored and they are multiple ways for Windows to display dialogs. These may include when an Application crashes, Windows system messages and general messages from an application. The software must support double-byte languages generally.

The Pro serial will have an encoded flag to enable "staff" features within the client. These are features that make it easier to collect accurate information from a group of experts. This area has yet to be defined, but might provide advanced include/exclude features directly from the FaultWire drop-down with the ability to send this data to our server to help make our default include/exclude lists. It may be a v2 feature.

Settings will be stored in XML format rather than the registry.

When loaded, FaultWire will appear in the SystemTray. If double-clicked, the application will start. If right clicked, three options appear—FaultWire Website, Application, and Exit. The FaultWire Website goes to http://www.fault-wire.com. Application runs the FaultWire application. Exit will unload FaultWire.

SQL will generally serve as the back-end database. This may be MySQL or another compatible design. The database collects information from the users. It needs to identify if the information has already been saved, and if so, only update various counters indicating the number of occurrences of a specific issue. The database design must have the flexibility to support large growth, should the project expand as expected. Whenever possible, the client application will be responsible for calculations and analysis, reducing the server run-time load.

The data is sent in one and possibly a second phase. With the first phase (stage=1), the client sends the server a subset of data to check if we have previously recorded the issue or not. If we don't have the issue (i.e. it's never been set for this issue), we'll then ask that the entire set be sent as a stage 2 or 3. I expect to complete this first phase today (data lookup, setting occurrence counters, etc.).

The server will return status and a URL that you will use if the user clicks on the FaultWire button. This page is NOT displayed to the user. In all cases, including if we've never recorded the issue, I'll provide a good URL. It may be replaced in stage 2, as stage 1 may provide a more generic URL if the data doesn't yet exist in the database.

For example, a brand new error occurs. You send the subset data to issue_check.php as stage 1. The server will return a code that requires the full set of data and a temporary URL should the user attempt press it before we've completed all our stage 2/3 operations in the background.

With the return code of 2 or 3 (send more data) the client sends all the data it has with stage=2 (or 3) to issue_check.php. The server saves the data in the database and links a number of items up. It will also return a final URL that replaces the URL in the first phase. Stages 2 & 3 are not yet implemented. I'll try and wrap it up this week, but it shouldn't slow down implementation of stage 1 on your end if you're ready. An SSL connection (https:// . . . ) may be used to encrypt the data.

The database used in embodiments of the invention will be mostly manually generated initially, but automatic generation is contemplated by various embodiments as well. When client information is passed to the server, if the company name is not in the database it will be added, but at that time, no other information will be available.

TABLE 2.1 sample data field for use

| Field name | Field Type | Size | Description | Example |
|---|---|---|---|---|
| KeyID | Varchar | 100 | This is made up of the company name, set to lower case and removing all characters other than A-Z and 0-9. Suffixes such as "Corporation", "Inc", "Ltd", "LLC", "Corp", "SA", "NV", "Company", "Co", "GmbH", are removed. | vcommunications |
| Name | Varchar | 100 | Full name | V Communications, Inc. |
| AltName | Varchar | 40 | Alternative company name (in KeyID format) | vcom |
| Status | Varchar | 12 | Status of item | Hidden, deleted, changed, reviewed |
| LockedBy | Varchar | 30 | Specify who is currently editing the entry to prevent two users from editing same entry. | frank |
| Importance | Varchar | 10 | Value of company to software messages | 0 = not important, 3 = very important (i.e. large software company) |
| LinkCompnay | Varchar | 40 | When companies change name, this field links to the current company for address and other details | avanquestpublishingusa |
| LinkReason | Varchar | 255 | Why linked | V Communications was purchased by Avanquest in 2005 |
| PrivateNotes | Text | - | Non-published internal notes | |
| Address1 | Varchar | 60 | First street address | 7031 Koll Center Parkway, Suite 150 |
| Address2 | Varchar | 60 | Optional Second Line | |
| City | Varchar | 40 | City | Pleasanton |
| State | Varchar | 20 | State or Provence | CA |
| Zip | Varchar | 12 | Zip or Postal code | 94566 |
| Country | Varchar | 30 | Country | USA |
| MainPhone | Varchar | 30 | Main phone number | 1-925-425-1700 |
| MainTollFree | Varchar | 30 | Main toll free number | 1-800-325-0834 |
| MainTollNote | Varchar | 50 | Special notes about number | Sales, Enter 1 at the voice prompt |
| MainFax | Varchar | 30 | Fax | 1-925-425-1800 |
| SupportPhone1 | Varchar | 30 | Support | 1-925-474-1701 |
| SupportNote1 | Varchar | 50 | Special notes about number | Enter 3 at the voice prompt |
| SupportPhone2 | Varchar | 30 | Support Alternate | |
| SupportNote2 | Varchar | 50 | Special notes about number | |
| SupportFax | Varchar | 30 | Separate Support Fax | |
| SupportEmail | Varchar | 100 | Tech support email | support@avanquestusa.com |
| SupportHours | Varchar | 60 | Normal hours | M-F 8 am to 5 pm PST |
| SalesEmail | Varchar | 140 | Sales email | sales@avanquestusa.com |
| WebMain | Varchar | 140 | Main company web page | http://www.avanquest.com |
| WebUSA | Varchar | 140 | Main usa web page (if different from WebMain) | http://www.avanquestusa.com |
| WebSupport | Varchar | 140 | Support web page | http://support.avanquestusa.com |
| WebDownload | Varchar | 140 | Download web page | |
| WebForum | Varchar | 140 | Forum or community web page | |
| WebSales | Varchar | 140 | Link to sales | |
| WebNews | Varchar | 140 | Link to companies press/news | |
| WebContact | Varchar | 140 | Page where address and phone numbers reside (FW use only - not shown to users) | |
| StockLookup | Varchar | 20 | Symbol required by Yahoo to look up data | AVQ.PA |
| StockText | Varchar | 30 | Stock symbol that appears in output | AVQ (Euronext) |
| YearStarted | Varchar | 4 | Year since started | 1984 |
| AnnualRevenue | Int | 11 | Company's annual revenue in millions | 74 |

TABLE 2.1-continued sample data field for use

| Field name | Field Type | Size | Description | Example |
|---|---|---|---|---|
| Employees | Int | 11 | Number of employees | 400 |
| Description | Text | - | Description of company | Avanquest Software specializes in the development and publishing of personal and professional communication, utilities, security and multimedia software. |
| LogoLarge | Varchar | 50 | Image of logo up to 150 × 150 (optimize for 150 wide if not square) | logo_avanquest_150.jpg |
| LogoSmall | Varchar | 50 | Small 16 × 16 logo (may not be used) | logo_avanquest_16.gif |
| ModifiedDate | Datetime | | Date and time of last update (auto-filled in) | 20-Oct-2007 11:32 am |
| ModifiedBy | Varchar | 10 | Login name of last person to update (auto-filled in) | Frank |
| CountAccess | Int | 11 | Number of times accessed | 23 |
| CountIssues | Int | 11 | Number of issues assigned to this company (in issues databases) | 3 |
| DriverVendor | Varchar | 50 | Links to related keys in driver_vendors | 13,234,1922 |

The KeyID must be unique. If necessary add a digit to make the name unique.

This database will be mostly automatically generated. The client program sends data and if needed, it is recorded in the database. See below for details on the process and field names. There are different types of tables:
  Windows XP OS issue
  Windows Vista OS issues
  Windows 7 OS issues (future)
  Windows 8 OS issues (future)
  Application issues (i.e. not part of OS)
  Crash and Hang Exception issues Ideally, applications that are included as part of the OS will remain in the related OS table, but this may prove difficult and is acceptable if some or all of these end up in the application table.

For each issue table, there is a corresponding "raw" table, used to store the incoming client data. The raw tables allow for saving multiple sets of data from a client on any issue. We may elect to stop collecting data once some threshold has been met, such as 20 occurrences of the specific issue. This data can be useful in finding a solution and/or seeing if there is some specific set of facts that the issue occurs. For example, an issue occurs only in Windows XP SP1.

TABLE 2.2

Issue Data Table (generic)

| Field name | Field Type | Size | Description | Examples |
|---|---|---|---|---|
| IssueKey | Int | 11 | Unique sequencal key | 1001 |
| Issue Code | Varchar | 40 | A hopefully unique hash of the non-variable text from the title, body, application name and exception code (if present) for this specific OS. 32 hex characters | 6C13709C0BA708BB7600 29B6E5FBCA40 |
| Status | Enum | | Hidden, deleted, auto, changed, reviewed | Auto |
| LockedBy | Varchar | 30 | Indicates staff person who is currently editing record | Frankvg |
| PrivateNotes | Text | | Staff notes that are never displayed to user | Joe - could you review the solutions? |
| OSMash | Varchar | 20 | Version mash up to identify the OS type comprised of OS name and Variant shortcuts like XPH (XP home); Version, Build, Service pack and bits (6 = 64, 3 = 32) [OS MASH is not currently used] | VHP606000P26 (This means: Vista Home Premium, v6.0, build 6000, Service Pack 2, 64-bit |
| OSNamePrimary | Varchar | 20 | Typically XP or Vista | XP Vista |
| OSNameType | Varchar | 20 | OS variant name | Professional (as in XP) Business (as in Vista) |

TABLE 2.2-continued

Issue Data Table (generic)

| Field name | Field Type | Size | Description | Examples |
|---|---|---|---|---|
| OSVersion | Varchar | 10 | Version followed by the 4 digit build number | 5.1.2600 (XP) 6.0.6000 (Vista) |
| OSServicePack | Int | 11 | Service pack number | 2 |
| OSBits | Int | 11 | 32 or 64 bit OS variant | 32 |
| CountOccursTotal | Int | 11 | Count of occurrences of dialog (user may not have viewed html) | 163 |
| CountMonth1 | Int | 11 | Occurrences this month | 121 |
| CountMonth2 | Int | 11 | Occurrences in month-1 | 36 |
| CountMonth3 | Int | 11 | Occurrences in month-2 | 6 |
| CountMonth4 | Int | 11 | Occurrences in month-3 | 0 |
| CountMonth5 | Int | 11 | Occurrences in month-4 | 0 |
| CountMonth6 | Int | 11 | Occurrences in month-5 | 0 |
| CountMonth7 | Int | 11 | Occurrences in month-6 | 0 |
| CountMonth8 | Int | 11 | Occurrences in month-7 | 0 |
| CountMonth9 | Int | 11 | Occurrences in month-8 | 0 |
| CountMonth10 | Int | 11 | Occurrences in month-9 | 0 |
| CountMonth11 | Int | 11 | Occurrences in month-10 | 0 |
| CountMonth12 | Int | 11 | Occurrences in month-11 | 0 |
| CurrentMonth | Date | | Holds the current date for occurrences counters. When actual month changes, counts for months over 1 year are discarded | 2007-12-31 |
| CountClientHits | Int | 11 | Count of html page views from FaultWire client (does not include manual and robot views) | 96 |
| CountAllPageHits | Int | 11 | Count of all html page views (Handled by server) | 124 |
| RatingSolved | Int | 11 | Number of users who rated it solved | 28 |
| RatingFailed | Int | 11 | Number of users who rated it as not working | 1 |
| CompanyLink | Varchar | 100 | Link to company database key | microsoft |
| CompanyRough | Varchar | 100 | Name extracted - only used if CompanyLink not built | Microsoft Corporation |
| DialogTitle | Varchar | 255 | Text within Titlebar | Destination Folder Access Denied |
| DialogBody | Text | | Body text (supports line breaks and variables are removed - see notes after table). | You need permission to perform this action . . . |
| DialogWidth | Int | 11 | Width in Pixels of dialog | 450 |
| DialogHeight | Int | 11 | Height in Pixels of dialog | 224 |
| DialogTextHpos | Int | 11 | Horiz Pixel position of start of text | 40 |
| DialogTextVpos | Int | 11 | Vertical Pixel position of start of text. | 24 |
| DialogIcon1 | Varchar | 100 | Titlebar icon 16 × 16 | destination_folder3_title.png |
| DialogIcon2 | Varchar | 100 | Main graphic | Warning4.png |
| DialogIcon2Hpos | Int | 11 | Horiz position of graphic 2 | 10 |
| DialogIcon2Vpos | Int | 11 | Vert position of graphic 2 | 10 |
| DialogIcon3 | Varchar | 80 | Secondary graphic | destination_folder3_alt.png |
| DialogIcon3Hpos | Int | 11 | Horiz position of graphic 3 | 40 |
| DialogIcon3Vpos | Int | 11 | Vert position of graphic 3 | 35 |
| DialogScreenShot5 | Varchar | 80 | Screen shot (XP or 1 of 4) | destination_folder3_screen.jpg |
| DialogScreenShot6 | Varchar | 80 | Screen shot (Vista or 2 of 4) | destination_folder22_screen.jpg |
| DialogScreenShot7 | Varchar | 80 | Screen shot (Win7 or 3 of 4) | destination_folder61_screen.jpg |
| DialogScreenShot8 | Varchar | 80 | Screen shot (Win8 or 4 of 4) | destination_folder97_screen.jpg |
| DialogType | Varchar | 20 | Type of issue in text - Minor, Warning,, Fatal, Crtical, etc. | Warning |
| DialogButton1 | Text | | Text on first button | Try Again |
| DialogButton1Explain | Text | | Description by FaultWire staff | This only works if you've fixed the issue while the dialog was left on-screen. |
| DialogButton1Style | Int | 11 | 0 = xp, 1 = Vista, 2 = Vista wide mulit-line | 0 |
| DialogButton1Hpos | Int | 11 | Horiz position | 322 |
| DialogButton1Vpos | Int | 11 | Vert position | 524 |
| DialogButton2 | Text | | Text on button 2 | Cancel |
| DialogButton2Explain | Text | | Description by FaultWire staff | Close the dialog - no actions taken. |
| DialogButton2Style | Int | 11 | 0 = default, 1 = Vista wide | 0 |
| DialogButton2Hpos | Int | 11 | Horiz position | 389 |
| DialogButton2Vpos | Int | 11 | Vert position | 524 |

TABLE 2.2-continued

Issue Data Table (generic)

| Field name | Field Type | Size | Description | Examples |
|---|---|---|---|---|
| DialogButton3 | Text | | Text on button 3 | |
| DialogButton3Explain | Text | | Description by FaultWire staff | |
| DialogButton3Style | Int | 11 | 0 = default, 1 = Vista wide | |
| DialogButton3Hpos | Int | 11 | Horiz position | |
| DialogButton3Vpos | Int | 11 | Vert position | |
| DialogButton4 | Text | | Text on button 4 | |
| DialogButton4Explain | Text | | Description by FaultWire staff | |
| DialogButton4Style | Int | 11 | 0 = default, 1 = Vista wide | |
| DialogButton4Hpos | Int | 11 | Horiz position | |
| DialogButton4Vpos | Int | 11 | Vert position | |
| DialogButton5 | Text | | Text on button 5 | |
| DialogButton5Explain | Text | | Description by FaultWire staff | |
| DialogButton5Style | Int | 11 | 0 = default, 1 = Vista wide | |
| DialogButton5Hpos | Int | 11 | Horiz position | |
| DialogButton5Vpos | Int | 11 | Vert position | |
| DialogButtonDefault | Num | Byte | Which button is default (zero if no default) | 1 |
| DialogButtonClose | enum | True-False | Close button in title bar? | True |
| DialogButtonMax | enum | True-False | Maximize button in title bar? | False |
| DialogButtonMin | enum | True-False | Minimize button in title bar? | False |
| DialogButtonHelp | enum | True-False | Help button in title bar? | False |
| ProblemEventName | Text | 30 | Problem Event Name | APPCRASH |
| Application | Varchar | 255 | Name of the application | Explorer |
| AppFilename | Varchar | 100 | Filename of the application | Explorer.exe |
| AppPath | Varchar | 255 | Path of the application | C:\Windows |
| AppLink | Enum | True-False | True if link to filenames database is available | True |
| AppTime | Time | | File time of application (modified) | 15:23:00 |
| AppDate | Date | | File date of application (modified) | 2007-12-31 |
| AppDescription | Varchar | 255 | Description of application | File manager |
| AppVersion | Varchar | 20 | Version string | 6.0.0 |
| ModuleName | Varchar | 100 | Name of the fault module (if present) | Foobar2.dll |
| ModulePath | Varchar | 255 | Path of the fault module | C:\Windows |
| ModuleTime | Time | | File time of fault module (modified) | 14:19 |
| ModuleDate | Date | | File date of fault module (modified) | 2007-12-31 |
| ModuleLink | Enum | True-False | True if link to filenames database is available | True |
| ModuleDescription | Varchar | 255 | Description of fault module | Validity check |
| ModuleVersion | Varchar | 20 | Version string | 6.0.0.123 |
| ExceptionCode | Int | 11 | Exception code | 0x12000CEF |
| ExceptionOffset | Int | 11 | Where Exception occurs | 0xE2190238 |
| HangType | Varchar | 10 | A digit from error message | 0 |
| HangSignature | Varchar | 10 | Hex value | a24b |
| CrashOS | Varchar | 30 | Currently unused | |
| LocaleID | Int | 11 | Language type | 1033 |
| English | Enum | True-False | If LocaleID is an English one | True |
| Description | Text | | Description written in html by FaultWire team - can include html and images, no scripts | |
| Solutions | Text | | Text for solution written in html by FaultWire team - can include html and image refrences, no scripts | |
| ForumLink | Varchar | 100 | Html link for accessing the forum on this topic | .../forums/showthread.php?t = 215 |
| SearchAlt | Varchar | 60 | Alternative Search string for Google serarch. If blank, uses dialog title as string. | |
| Copyright | Text | | Any copyright string, which can be helpful to identify some companies | Copyright 2008 © XYZ Inc., All rights reserved. |
| WinStyle | Varchar | 10 | Visual style - "xp", "basic", "framed" or "unframed" | basic |
| UserModifiedDate | DateTime | | Date of last update automatically from user | 2007-12-11 09:55:25 |

TABLE 2.2-continued

Issue Data Table (generic)

| Field name | Field Type | Size | Description | Examples |
|---|---|---|---|---|
| UserModifiedBy | Varchar | 40 | Install GUID of user who's data was used | AB97AEE85E89C4CC093AB8362D38C |
| FWModifiedDate | DateTime | | Date of last update by FaultWire staff | 2008-04-26 16:17:04 |
| FWModifiedBy | Varchar | 30 | Who at FW did the last update | Frank |

Other than counts and forced manual fields, other fields are set with the first occurrence and not changed afterwards, except by our manual intervention. The web page construction will use the user's actual values as overrides in some cases, such as the DAppPath, DAppTime, etc. See section 5.3 for more about overrides and how the data is used to construct the web page.

The invention may require manually add additional information to the issues tables, such as a description, solution, button explanations and/or an improved screen shot image. Once a field is filled in, it will not be overwritten. This allows modifications without future client errors changing this data. The frequency of occurrence data will also be used to focus efficiency on the most frequently occurring items.

The process for tracking and packaging the data for display is automatic. Only one class of solutions has an automatic solution—exceptions and BSoD (Blue Screen of Death) issues. Both of these errors include a specific code number in the error. When the this type of errors occur, we do a lookup to see if we already have this code along with solutions. If so, we can then include those solutions on the created web page. These solutions were created manually, and include most known Windows codes (about 1600 exceptions and maybe 300 fatal stop codes). The exception codes allow for a third-party vendor to create their own codes (which never overlap Microsoft's codes), in which case it would be unlikely we would have a solution, although it could be added. Third party codes are quite rare. For other errors and issues the solution has to be manually generated. Once a solution is created, then future users who encounter the problem will get the benefit of this solution automatically.

Items shaded in light green in table 2.2 are typically automatically created, or manually created after the issue data was saved. Depending on the event, it is unlikely that every item (in white) will be available. This is expected. Items in bold are the most critical items and should (hopefully) be available on every issue. Other items are also important, but might depend on a number of factors if the items are even available.

File names for graphics will be created by the server to ensure no overlaps with other messages.

The Web server portion of the invention will initially reside on the same computer as the database server, but may be located in different places for various embodiments of the invention. The design is flexible to support splitting the web server from the database server as the site portion of the invention expands. The Web server has the responsibility for accessing the database to build each issue page on-the-fly. A template design will complete the generic navigation, ads may be displayed and other visual elements. The main embodiment of the server is designed using PHP, JavaScript and MySQL to be very portable. Testing and proper operation is verified on web servers hosted by Windows Server 2008 and Linux.

The client program communicates with the FaultWire Web server through PHP server code using standard HTML POST protocols. A quick summary of actions includes checking if an issue has already been saved or not, transferring data if not saved, and getting a URL to be used that links the desired page.

For all data sent to the server, if a value is unknown, the client has the option of either not sending the item so that the server will assign a default value, or you can assign a default value of NULL (" ") for strings, and zero for values. The server code fully validates all data sent to it and will not generate an error if any optional field is missing.

In the stage 1 step, the client has detected an issue (warning, error or informational) and needs to find out if the server needs a full drop of data and to get what URL to call when a user elects to press the purple FaultWire button on the issue dialog.

The following set of data is sent to the server using the Post variables indicated to the URL.

TABLE 3.1

Data sent to server

| Name | Examples | Stages Required | Notes |
|---|---|---|---|
| Stage | 1 | All | Stage 1 has limited info as shown below. Stage 2 or 3 used to send additional information |
| LicenseKey | ABCDE-12345-ABCDE-12345-ABCDE | All | will be blank for trial version |
| FWversion | 1.01 | All | Version of FaultWire |
| Debug | 0, 42, 43 | optional | See section 5.3.3 |
| iFlag | 4C2504E02F89D1D33A0C1305E823322 | All | GUID created when FW installed (strip any dashes) - 16 bytes (32 hex characters) |
| Reg1 | 59812 | 1 | (Random Value 0-65534) + 28237 |
| Category | Vista, XP, App | All | If not from OS, category is App (Application) |

TABLE 3.1-continued

Data sent to server

| Name | Examples | Stages Required | Notes |
|------|----------|-----------------|-------|
| OS | Vista, XP | All | |
| VendorRaw | Microsoft, Avanquest Publishing, Symantec Corp, Adobe | All | Category Vista/XP always uses "Microsoft" |
| Application | Explorer, Notepad, Firefox, Fix-It Utilities | All | Can be the filename without extension if there is no application name |
| Exception | 301999192 | All | Exception code comes from Application crashes (decimal). Ignore or set to zero if no exception |
| Title | Destination Folder Access Denied | All | Full title |
| Body | You need permission to perform this action keylooger.exe Date created: 2/12/2008 4:51 PM Size: 16.0 KB | All | Full body, include line breaks (C style \n) |
| TestData | Company Name: Foo Corporation www.mysite.com/index.html | None | Used for testing of filtering function only in debug mode. It is never sent from client nor saved. |

The server checks if the issue has been saved (or required additional raw entries) or not, and returns the 3 items immediately following the keyword "FaultWire:" comma separated. For example: SITENAME: 1, http://www.faultwire.com/solutions/Windows_Vista_solution.php?keyid=1001, (Ok)

TABLE 3.2 three results are explained

| Name | Examples | Notes |
|------|----------|-------|
| Upload Value | 1, 3 | Indicates if more data needs to be sent: 0 = Error (database, server, etc.) 1 = Do not send more data - done! 2 = Send full data set, but no images 3 = Send full data set with images |
| Reg2 | 38293 | Validation value to send in Stage 2 or 3 |
| Solution URL | http://www.faultwire.com/solutions/Windows_Vista_solution.php?keyid=1001 | Where to go if button clicked (it will be set to generic URL if the item has not been created yet and more data is needed). |
| Message | (Ok), (Unable to connect to database.), (Query problem.) | Usually "(Ok)", this is the text status with a short message if there is some problem. For now, this is internal use only (not displayed to the user). |

In all cases a Solution URL will be provided. The Solution URL may change during later stages. For example, if the issue has never seen before, the Upload value of "3", will be returned, indicating a need for a full set of data. The Server will provide a temporary URL that if used, will go into a more generic part of the site rather than a specific issue. The duration between stage 1 and the end of later stage will be designed to be minimal.

These later stages, stages 2 and 3, are used to send data from the client to the server for saving. The data will be used in the results page or collected to assist in creating solutions. Functionally, these stages are similar to stage 1, but additional data is sent. All data goes to the same url as described above Many of these fields are optional and/or may not be relevant for a specific error or issue, but to the extent possible, the data should be collected and sent.

Stage 1 returns the upload value. If it returns a 2 or 3, it indicates we want more data as follows:

UploadValue=2 Send all the data as stage 2, but images are not necessary (screen shot, icons, etc.). This is typically used when we have at least 1 set of data, and we are only collecting additional data sets to assist the FaultWire staff with solutions. It is also used for crashes and hangs, since collecting a screen shot is problematic.

UploadValue=3 Send all the data as stage 3 and include all images that are available (screen shot, icons, etc.). In this case, we've detected this as a new issue we haven't seen before and we need to save all the data.

At the Web server, stages 2 and 3 are similar. Stage 3 will accept images, where in stage 2 they would be ignored. If images are present in Stage 3 AND we have not saved them before, we'll save them. If we have the images (and other fields) from a prior save and we are only collecting raw data, we'll ignore any images sent. The primary purpose of stage 2 is to reduce the communication data in some situations. It could be possible that we request a stage 3, and the client responds with stage 3 data, but may not have any images to send. No errors will be generated in this situation.

If a Stage 3 request is made, and image data is in the process of being uploaded, the user could close the error dialog before the data is completely sent. This causes a partial upload and the image is discarded.

The following chart helps explain the POST values we need. Note that the first items are the same as Stage 1. Stage 1 does not save any information other than to increment the occurrence counters for the issue (if it already exists). In the chart below, names in bold indicate Important fields (although some may remain undefined or blank if not relevant to the issue dialog).

TABLE 3.3 post values.

| Name | Examples | Stages Required | Notes |
|---|---|---|---|
| Stage | 2, 3 | all | Stage 2 or 3 used to send additional information |
| LicenseKey | ABCDE-12345-ABCDE-12345-ABCDE | all | will be blank for trial version |
| FWversion | 1.01 | all | Version of FaultWire |
| Debug | 0, 42, 43 | optional | See section 5.3.3 |
| iFlag | 4C2504E02F89D1D33A0C1305E82C3322 | all | GUID created when FW installed (strip any dashes) - 16 bytes (32 hex characters) |
| Reg1 | 59812 | 2, 3 | Same value as sent in Stage 1 (not a new random number) |
| Reg2 | 38293 | 2, 3 | Value returned from Stage 1 |
| Category | Vista, XP, App | all | If not from OS, category is App (Application) |
| OS | Vista, XP | all | |
| VendorRaw | Microsoft, Avanquest Publishing, Symantec Corp, Adobe | all | Category Vista/XP always uses "Microsoft" |
| Application | Explorer, Notepad, Firefox, Fix-It Utilities | all | Can be the filename without extension if there is no application name |
| Exception | 301999192 | all | Exception code comes from Application crashes (decimal). Ignore or set to zero if no exception code |
| Title | Destination Folder Access Denied | all | Full title |
| Body | You need permission to perform this action keylooger.exe Date created: 2/12/2008 4:51 PM Size: 16.0 KB | all | Full body, include line breaks (C style \n) |
| OS_Name_Type | Business, Professional | 2, 3 | Windows Variant name |
| OS_Version | 6.0.6000 | 2, 3 | Full version |
| OS_Service_Pack | 1 | 2, 3 | Service pack number |
| OS_Bits | 32 | 2, 3 | 32 or 64 |
| Dialog_Text_Hpos | 35 | 2, 3 | First text horizontal starting position |
| Dialog_Text_Vpos | 10 | 2, 3 | First text vertical starting position |
| Dialog_Icon_2_Hpos | | 2, 3 | Position of image2 |
| Dialog_Icon_2_Vpos | | 2, 3 | Position of image2 |
| Dialog_Icon_3_Hpos | | 2, 3 | Position of image3 |
| Dialog_Icon_3_Vpos | | 2, 3 | Position of image3 |
| Dialog_Type | warning | 2, 3 | Type of issue in text - warning, fatal, forbidden, invalid, information, selection (based off of text in title or body, or type of icon) |
| Dialog_Button_1 | Try again | 2, 3 | Text on button |
| Dialog_Button_1_Style | 1 | 2, 3 | 0 = xp, 1 = vista, 2 = wide vista with multi-line text |
| Dialog_Button_1_Hpos | 120 | 2, 3 | Horizontal position |
| Dialog_Button_1_Vpos | 220 | 2, 3 | Vertical position |
| Dialog_Button_2 | Cancel | 2, 3 | Text on button |
| Dialog_Button_2_Style | 1 | 2, 3 | 0 = xp, 1 = vista, 2 = wide vista with multi-line text |
| Dialog_Button_2_Hpos | 140 | 2, 3 | Horizontal position |
| Dialog_Button_2_Vpos | 220 | 2, 3 | Vertical position |
| Dialog_Button_3 | | 2, 3 | Text on button |
| Dialog_Button_3_Style | | 2, 3 | 0 = xp, 1 = vista, 2 = wide vista with multi-line text |
| Dialog_Button_3_Hpos | | 2, 3 | Horizontal position |
| Dialog_Button_3_Vpos | | 2, 3 | Vertical position |
| Dialog_Button_4 | | 2, 3 | Text on button |
| Dialog_Button_4_Style | | 2, 3 | 0 = xp, 1 = vista, 2 = wide vista with multi-line text |
| Dialog_Button_4_Hpos | | 2, 3 | Horizontal position |
| Dialog_Button_4_Vpos | | 2, 3 | Vertical position |
| Dialog_Button_5 | | 2, 3 | Text on button |
| Dialog_Button_5_Style | | 2, 3 | 0 = xp, 1 = vista, 2 = wide vista with multi-line text |
| Dialog_Button_5_Hpos | | 2, 3 | Horizontal position |
| Dialog_Button_5_Vpos | | 2, 3 | Vertical position |
| Dialog_Button_Default | 2 | 2, 3 | Default button (1-5), 0 = no default |
| Dialog_Button_Close | true | 2, 3 | Title bar has a close button |
| Dialog_Button_Max | false | 2, 3 | Title bar has a Maximize button |

TABLE 3.3-continued post values.

| Name | Examples | Stages Required | Notes |
|---|---|---|---|
| Dialog_Button_Min | false | 2, 3 | Title bar has a Minimize button |
| Dialog_Button_Help | false | 2, 3 | Title bar has a Help button |
| Problem_Event_Name | APP CRASH | 2, 3 | |
| App_Filename | Explorer.exe | 2, 3 | Application filename |
| App_Path | C:\windows\ | 2, 3 | |
| App_Time | 18:57:00 | 2, 3 | Use 24-hour format |
| App_Date | 2008-12-31 | 2, 3 | Use YYYY-MM-DD format |
| App_Description | This is a description | 2, 3 | |
| App_Version | 1.20.2345 | 2, 3 | |
| Module_Name | Explorer.dll | 2, 3 | |
| Module_Path | c:\windows\ | 2, 3 | |
| Module_Time | 14:44:00 | 2, 3 | Use 24-hour format |
| Module_Date | 2008-12-31 | 2, 3 | Use YYYY-MM-DD format |
| Module_Description | Handles network access for explorer | 2, 3 | |
| Module_Version | 1.20.2345 | 2, 3 | Text string - any format ok |
| Exception_Offset | 3793289784 | 2, 3 | Send as decimal |
| HangType | 0 | 2, 3 | Decimal? |
| HangSignature | A33f | 2, 3 | Hex |
| Locale_ID | 1033 | 2, 3 | Language code (1033 is English) |
| Copyright | 2008 © XYZ, Inc. | 2, 3 | Text string - any format ok |

Additional Images for Stage 3. No errors will occur if any or all of the images are missing. These images are passed along with the POST data above by using the name "upimages[ ]", as an array. The POST value holds the filename and must be exactly as shown in the table below—all lowercase. Use of any other filenames will be ignored and not saved. The server code will validate the file and save it under a new filename.

TABLE 3.4

Image values.

| Name | Value | Stages Required | Notes |
|---|---|---|---|
| upimages[ ] | image1.jpg | 3 | This image is that appears in the title bar, typically 16 × 16. Many dialogs do not have this image.* |
| upimages[ ] | image2.jpg | 3 | This image is that appears within the body. Many dialogs do not have a body image.* |
| upimages[ ] | image3.jpg | 3 | This is a second image is that may appear within the body. Most dialogs do not have this image.* |

TABLE 3.4-continued

Image values.

| Name | Value | Stages Required | Notes |
|---|---|---|---|
| upimages[ ] | screen.jpg | 3 | The screen shot made by the client program. Size is not important, as the server will resize if necessary. |

The following example shows of how a HTML file might send the image data for four images:

```
<form enctype="multipart/form-data" id="form1" name="form1"
method="post" action="..\_comm\issue_check.php">
<input name="Send" type="submit" id="Send" value="Send Data" />
  <input type="hidden" name="MAX_FILE_SIZE" value="500000" />
  // also limited at the server
<input name="upimages[ ]" type="file" size="80" maxlength="100" />
// one line for each image sent
<input name="upimages[ ]" type="file" size="80" maxlength="100" />
<input name="upimages[ ]" type="file" size="80" maxlength="100" />
<input name="upimages[ ]" type="file" size="80" maxlength="100" />
...
</form>
```

TABLE 3.5

Image results are explained

| Name | Examples | Notes |
|---|---|---|
| Upload Value | 1 | 0 = Error (input, database, server, etc.) 1 = Done |
| Reg2 | 0 | Not currently used, will be zero |
| Solution URL | http://www.faultwire.com/solutions/Windows_Vista_solution.php?keyid=1001 | Where to go if FaultWire solutions button clicked |
| Message | (Ok), (Unable to connect to database.), (Query problem.) | Usually "(Ok)", this is the text status with a short message if there is some problem. For now, this is internal use only (not displayed to the user). |

When stage 2 or 3 results are returned the database has been updated with the new data and a user should be able to click-through using the Solution URL to the specific page.

Server side actions with Stage 2 include:
Filter all input for length, html, bad characters, etc.
Filter the Title and Body text for variables, such as paths, filenames, URLs, dates, times, etc.
Build the IssueCode to uniquely identify the issue
Find the company/vendor and link it in if found
Save the data in the primary and raw tables as appropriate
Create and link the forum entry
Return the URL of the target page on the FaultWire site
Display debug information if so requested
Add faults and new vendors to the administration action list

The invention claimed is:

1. A method for assisting a computer user with problem-solving a software error on a computational device, comprising the steps of:
   implementing and executing monitoring instructions on said computational device for detecting a software error in an user-launched executable program or operating system executed independently of said monitoring instructions, and determining a set of error parameters based on said software error;
   displaying, on said computational device, an option to access and display a set of assistance instructions;
   if said user chooses said option to access said set of assistance instructions, then accessing said set of assistance instructions based on set of error parameters; said set of assistance instructions stored on a networked server and accessed via network by said computational device;
   weighting, on a second computational device connected to said network server, said set of said assistance instructions based on said set of error parameters;
   displaying a set of assistance instructions on said computational device based on said weighting step;
   adding to store of assistance instructions to said software error parameters on said networked server;
   re-weighting said assistance instructions based on any user-implemented actions following said displaying step and said set of error parameters; wherein said displaying step includes determining the display characteristics of said executable program and mimicking said display characteristics in said executable program performing said displaying option step.

2. A method for assisting a computer user with problem-solving a software error on a computational device, comprising the steps of:
   implementing and executing monitoring instructions on said computational device for detecting a software error in an user-launched executable program or operating system executed independently of said monitoring instructions, and determining a set of error parameters based on said software error;
   displaying, on said computational device, an option to access and display a set of assistance instructions:
   if user chooses said option to access said set of assistance instructions, then accessing said set of assistance instructions based on set of error parameters; said set of assistance instructions stored on a networked server and accessed via network by said computational device;
   weighting, on a second computational device connected to said network server, sad of said assistance instructions based on said set of error parameters:
   displaying a set of assistance instructions on said computational device based on said weighting step;
   adding to store of assistance instructions to said software error parameters on said networked server;
   re-weighting said assistance instructions based on any user-implemented actions following said displaying step and said set of error parameters, wherein said displaying a set of assistance instructions includes screen shots with blurred out areas that change for each user.

3. A method for displaying information related to a display message from a first user-launched executable software program or operating system on a computational device:
   allowing a user to determine a set of variables to include or exclude from a set of display messages that may appear from said executable software program or operating system on said computational device;
   monitoring said first user-launched executable program and/or operating system for one of said display messages from any of said first user-launched software program(s) and/or operating system;
   determining if one of said display messages is included by using said set of user-determined variables;
   extracting parametric information from a said included display message;
   determining that said included display message is information, error or warning;
   saving said included display message content and related information to data storage;
   incrementing a frequency of occurrence counter;
   displaying said message with an additional solution button on said computational device,
   if said solution button is selected by a user, then:
   displaying said saved information;
   sending said parametric information to a database via a network;
   checking said database for more information based on said parametric information, and if said more information is available then sending said more information via network to said computational device and displaying description solutions on said computational device.

4. The method for displaying information related to an display message as recited in claim 3, further comprising the step of emailing alert other users to a specific problem or assist a corporate help desk.

* * * * *